United States Patent
Jin et al.

(10) Patent No.: US 12,250,572 B2
(45) Date of Patent: Mar. 11, 2025

(54) SIGNAL TRANSMISSION METHOD AND DEVICE

(71) Applicants: China Mobile Communication Co., Ltd Research Institute, Beijing (CN); China Mobile Communications Group Co., Ltd., Beijing (CN)

(72) Inventors: Jing Jin, Beijing (CN); Xiaodong Xu, Beijing (CN); Hua Shao, Beijing (CN); Ting Ke, Beijing (CN); Xueying Hou, Beijing (CN); Jianjun Liu, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 547 days.

(21) Appl. No.: 17/266,288

(22) PCT Filed: Jul. 26, 2019

(86) PCT No.: PCT/CN2019/097860
§ 371 (c)(1),
(2) Date: Feb. 5, 2021

(87) PCT Pub. No.: WO2020/029810
PCT Pub. Date: Feb. 13, 2020

(65) Prior Publication Data
US 2021/0306878 A1    Sep. 30, 2021

(30) Foreign Application Priority Data
Aug. 6, 2018  (CN) .......................... 201810886392.4

(51) Int. Cl.
*H04W 24/02*   (2009.01)
*H04B 17/345*  (2015.01)
(Continued)

(52) U.S. Cl.
CPC .......... *H04W 24/04* (2013.01); *H04B 17/345* (2015.01); *H04L 5/0048* (2013.01); *H04B 17/104* (2015.01)

(58) Field of Classification Search
CPC . H04B 17/104; H04B 17/345; H04J 11/0056; H04L 5/0048; H04L 5/0053; H04L 5/0073; H04W 24/02; H04W 24/04
See application file for complete search history.

(56) References Cited

U.S. PATENT DOCUMENTS 9,414,239 B2 *  8/2016  Brunk .................. G01S 5/0289
2014/0056190 A1  2/2014  Qian et al.
(Continued)

FOREIGN PATENT DOCUMENTS

| CN | 102655650 A | 9/2012 |
| CN | 102655652 A | 9/2012 |

(Continued)

OTHER PUBLICATIONS

LG Electronics, "New SI Proposal; Study on remote interference management for NR", 3GPP TSG RAN Meeting #80, RP-181396, La Jolla, USA, Jun. 11-15, 2018.

(Continued)

*Primary Examiner* — Phuc H Tran
(74) *Attorney, Agent, or Firm* — Price Heneveld LLP

(57) ABSTRACT

The present disclosure provides a signal transmission method and a signal transmission device. The signal transmission method includes: transmitting a first reference signal, the first reference signal indicating that the first network device is subjected to remote interference; and receiving a second reference signal, the second reference signal indicating that there is the remote interference and/or atmospheric ducting phenomenon.

13 Claims, 9 Drawing Sheets

(51) Int. Cl.
  *H04L 5/00*    (2006.01)
  *H04W 24/04*   (2009.01)
  *H04B 17/10*   (2015.01)

(56) References Cited

U.S. PATENT DOCUMENTS

| | | | |
|---|---|---|---|
| 2014/0219113 | A1 | 8/2014 | Li et al. |
| 2015/0195715 | A1 | 7/2015 | Nagata et al. |
| 2016/0285591 | A1* | 9/2016 | Dortmund ............ H04L 1/1877 |
| 2020/0044764 | A1* | 2/2020 | Xu ..................... H04L 5/0048 |
| 2021/0321268 | A1* | 10/2021 | Ly ..................... H04J 11/0056 |
| 2022/0263608 | A1* | 8/2022 | Wei ..................... H04W 72/23 |

FOREIGN PATENT DOCUMENTS

| | | | | |
|---|---|---|---|---|
| CN | 104956716 | A | | 9/2015 |
| CN | 105828349 | A | | 8/2016 |
| CN | 106941679 | A | | 7/2017 |
| CN | 107534876 | A | | 1/2018 |
| CN | 108243444 | A | | 7/2018 |
| CN | 108289311 | A | | 7/2018 |
| CN | 110971440 | A * | 4/2020 | ........... H04B 17/345 |
| CN | 118199764 | A * | 6/2024 | ........... H04B 17/345 |
| JP | 2013251859 | A | | 12/2013 |
| JP | 2014515896 | A * | 7/2014 | ........... H04W 28/04 |
| WO | 2016192590 | A1 | | 12/2016 |
| WO | 2020028205 | A1 | | 2/2020 |

OTHER PUBLICATIONS

CMCC, "Discussion on framework for RIM", 3GPP TSG RAN WG1 Meeting #94, R1-1808841, Gothenburg, Sweden, Aug. 20-24, 2018.

CMCC, "Discussion on remote interference management", 3GPP TSG RAN WGI Meeting #89, R1-1708401, Hangzhou, P.R. China May 15-19, 2017.

CMCC, "Motivaction for Remote Interference Management in NR", 3GPP TSG RAN Meeting #80, RP-181268, La Jolla, USA, Jun. 11-14, 2018.

LG Electronics, "Email discussion on Support on flexible duplex operation and remote interference management", 3GPP TSG RAN Meeting #80, RP-180999, La Jolla, CA, USA, Jun. 11-14, 2018.

Zhang, Long et al. "Research on Propagation Law and Optimization Solutions of Atmospheric Duct Interference for TD-LTE", Beijing, China.

Ting, Ke et al. "Study on Remote-Interference-Management for 5G NR", Beijing, China.

* cited by examiner

SIGNAL TRANSMISSION METHOD AND DEVICE

CROSS-REFERENCE TO RELATED APPLICATION

The present application is the U.S. national phase of PCT Application No. PCT/CN2019/097860 filed on Jul. 26, 2019, which claims a priority of the Chinese patent application No. 201810886392.4 filed on Aug. 6, 2018, which is incorporated herein by reference in its entirety.

TECHNICAL FIELD

The present disclosure relates to the field of communication technology, in particular to a signal transmission method and a signal transmission device.

BACKGROUND

Such a phenomenon as atmospheric ducting phenomenon easily occurs in an inland area at the end of spring and the beginning of summer or at the end of summer and the beginning of autumn, or in a coastal area in winter. As shown in FIG. 1, when the atmospheric ducting phenomenon occurs, there exists in the troposphere a thermal inversion layer or a layer where the amount of water vapor dramatically decreases along with an increase in height, which is called as atmospheric ducting phenomenon layer. A majority of radio radiation is restricted in the waveguide layer for super-refraction propagation. Due to the over-the-horizon propagation, a radio signal may be transmitted over a very large distance with relatively small path loss.

For a cellular radio communication system (e.g., a fourth-Generation (4G) Long Term Evolution (LTE) system, or a fifth-Generation (5G) New Radio (NR) system), when the atmospheric ducting phenomenon occurs, a strong interference may be caused by a downlink (DL) signal for a remote base station on the reception of uplink (UL) data for a local base station.

As shown in FIG. 2, due to the existence of the atmospheric ducting phenomenon layer, after the propagation over a very long distance (e.g., tens or hundreds of kilometers), a DL signal transmitted by a remote aggressor site (interference site or interfering site) still has relative high energy. When the signal enters a UL signal reception window of a local victim site (interfered site), the strong interference may be caused on the reception of the UL data for the local base station.

It is found in a current Time Division Long Term Evolution (TD-LTE) network that, the uplink data for the TD-LTE in such provinces as Jiangsu, Anhui, Hainan and He'nan is widely interfered, an uplink Interference over Thermal (IoT) is increased by up to 25 dB, and such Key Performance Indicator (KPI) as Radio Resource Control (RRC) connection establishment success rate is deteriorated seriously. Victim cells are mainly at a frequency band F in rural areas within a time period principally from 0:00 to 8:00, and hundreds to tens of thousands of base stations are affected.

As shown in FIG. 3, in the networking of a Time Division Duplexing (TDD) system, in order to prevent uplink and downlink interference between cells, usually a same uplink/downlink configuration is selected. In addition, a Guard Period (GP) is provided between downlink transmission and uplink transmission, and it usually includes N Orthogonal Frequency Division Multiplexing (OFDM) symbols (e.g., N<14). A GP length is selected in such a manner as to ensure that the downlink transmission for the base station within a certain range (e.g., tens of kilometers) does not interfere with the uplink reception for a current base station.

Usually, considering the loss of an electromagnetic wave propagated in the space, the current base station fails to experience the interference caused by the downlink transmission for the base station at a distance of tens or hundreds of kilometers.

However, due to such factors as atmospheric refraction and a propagation environment, the downlink transmission for a remote base station at a distance of tens or hundreds of kilometers may interfere with the uplink reception for the current base station, and this is called as remote interference. In the remote interference, an interference range is up to tens or hundreds of kilometers (e.g., 300 km), a propagation delay is 1 ms which is greater than the GP for uplink/downlink switching, and an interference source is a downlink resource before the GP.

Hence, there is an urgent need to provide a scheme for preventing the remote interference.

SUMMARY

An object of the present disclosure is to provide a signal transmission method and a signal transmission device, so as to prevent the remote interference.

In a first aspect, the present disclosure provides in some embodiments a signal transmission method applied for a first network device, including: transmitting a first reference signal, the first reference signal indicating that the first network device is subjected to remote interference; and receiving a second reference signal, the second reference signal indicating that whether the remote interference and/or atmospheric ducting phenomenon exists.

In a second aspect, the present disclosure provides in some embodiments a signal transmission method applied for a second network device, including: receiving a first reference signal, the first reference signal indicating that a first network device is subjected to remote interference; and transmitting a second reference signal, the second reference signal indicating that whether the remote interference and/or atmospheric ducting phenomenon exists.

In a third aspect, the present disclosure provides in some embodiments a first network device, including a first transceiver and a first processor. The first transceiver is configured to transmit a first reference signal, and the first reference signal indicates that the first network device is subjected to remote interference. The first transceiver is further configured to receive a second reference signal, and the second reference signal indicates that whether the remote interference and/or atmospheric ducting phenomenon exists.

In a fourth aspect, the present disclosure provides in some embodiments a second network device, including a second transceiver and a second processor. The second transceiver is configured to receive a first reference signal, and the first reference signal indicates that the first network device is subjected to remote interference. The second transceiver is further configured to transmit a second reference signal, and the second reference signal indicates that whether the remote interference and/or atmospheric ducting phenomenon exists.

In a fifth aspect, the present disclosure provides in some embodiments a network device, including a processor, a memory, and a computer program stored in the memory and executed by the processor. The computer program is executed by the processor so as to implement the steps of the above-mentioned signal transmission method applied for the first network device, or implement the steps of the above-mentioned signal transmission method applied for the second network device.

In a sixth aspect, the present disclosure provides in some embodiments a computer-readable storage medium storing therein a computer program. The computer program is executed by a processor so as to implement the steps of the above-mentioned signal transmission method applied for the first network device, or implement the steps of the above-mentioned signal transmission method applied for the second network device.

According to the embodiments of the present disclosure, through the second reference signal indicating that there is the remote interference and/or atmospheric ducting phenomenon, it is able to accurately determine whether a factor causing the remote interference has disappeared, thereby to effectively prevent the occurrence of a ping-pong effect when handling the remote interference.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
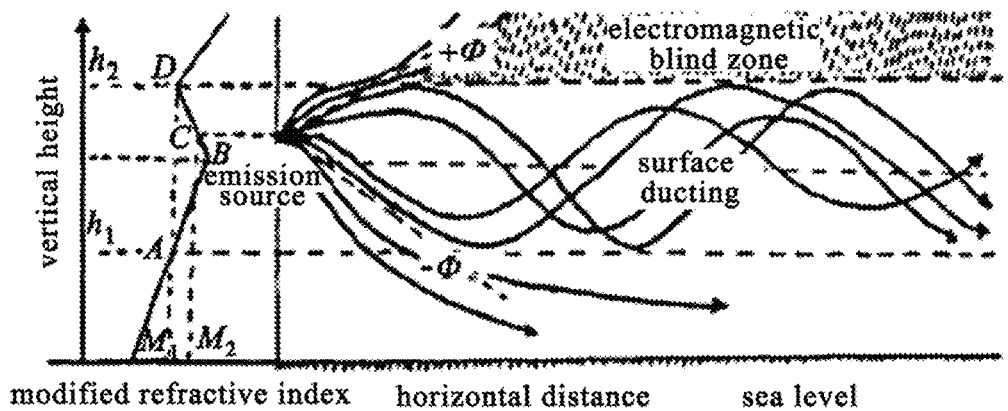
FIG. 1 is a schematic view showing an atmospheric ducting phenomenon.
Figure 2:
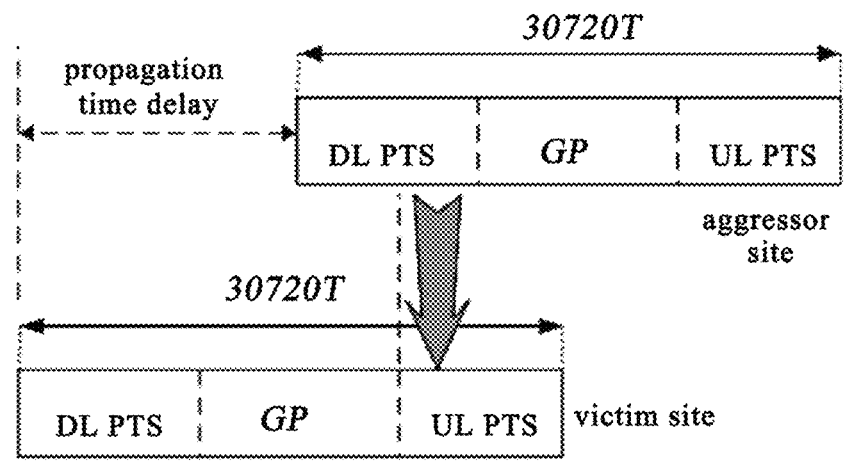
FIG. 2 is a schematic view showing interference caused by a remote base station.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B.

Such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

The technology described in the context shall not be limited to a Long Term Evolution (LTE)/LTE-Advanced (LTE-A) system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system, e.g., 5G NR.

The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (WiMAX), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the 3rd-Generation Partnership Project (3GPP). The technology described in the context may be applied to the above-mentioned systems and radio technologies, or applied to the other systems and radio technologies.

Figure 4:
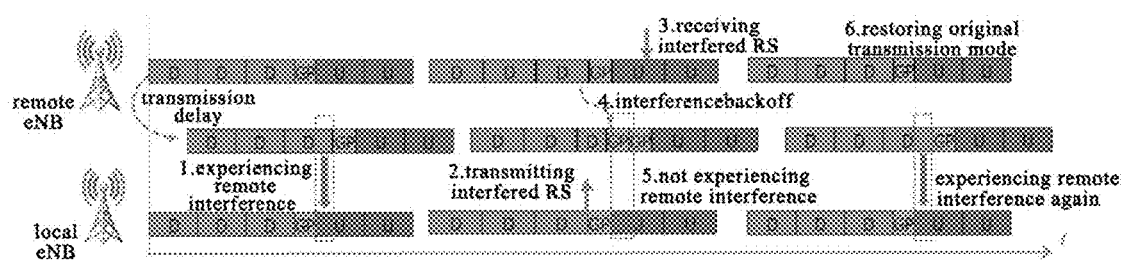
FIG. 4 is another schematic view showing the remote interference.

FIG. 4 shows a basic remote interference management procedure which includes the following steps.

Step 401: transmitting, by a victim site, an interfered signal when remote interference has been detected.

Step 402: upon the receipt of the corresponding interfered signal, performing, by an aggressor site, an interference backoff operation.

The interference backoff operation refers to an operation where a downlink transmission resource before a GP is sacrificed.

Step 403: stopping, by the victim site, the transmission of the interfered signal when the remote interference fails to be detected.

Step 404: restoring an original transmission mode when the aggressor site fails to receive the corresponding interfered signal.

However, in the above remote interference management procedure, subsequent to Step 404, when the factors that cause the remote interference, e.g., the atmospheric refraction, do not disappear, the victim site may be interfered continuously, and thereby it is necessary to perform Steps 401 to 404 again. At this time, a ping-pong effect may occur when handling the remote interference.

Figure 5:
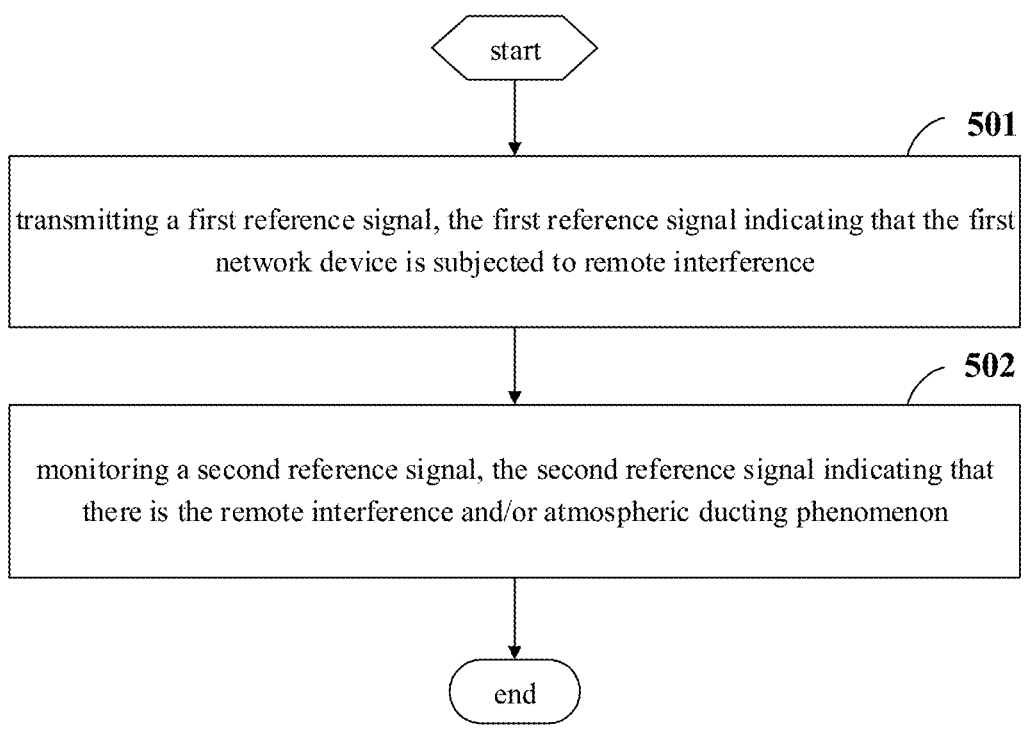
FIG. 5 is a flow chart of a signal transmission method according to one embodiment of the present disclosure.

As shown in FIG. 5, the present disclosure provides in some embodiments a signal transmission method executed by a first network device which serves as an aggressor site and/or a victim site. The first network device may be a 4G LTE base station, a 5G NR base station, or a network device in any other communication system. The signal transmission method includes the following steps.

Step 501: transmitting a first reference signal, the first reference signal indicating that the first network device is subjected to remote interference.

The first reference signal may be called as a reference signal of a first type, or an interfered signal. In a possible embodiment of the present disclosure, the first reference signal may be used to trigger another network device to perform an interference backoff operation.

In a possible embodiment of the present disclosure, in Step 501, when the first network device determines that there is the remote interference, the first network device may transmit the first reference signal. To be specific, when an uplink IoT of the first network device exhibits a remote interference characteristic, the first network device may determine that there is the remote interference, and transmit the first reference signal. When the uplink IoT exhibits the remote interference characteristic, it means that the uplink IoT is greater than a predetermined threshold. Of course, it should be appreciated that, the threshold will not be particularly defined herein.

Step 502: receiving a second reference signal, the second reference signal indicating that there is the remote interference and/or atmospheric ducting phenomenon.

The second reference signal may also be called as a reference signal of a second type, or a feedback reference signal. In a possible embodiment of the present disclosure, the second reference signal may be used to determine whether a atmospheric ducting phenomenon phenomenon has disappeared.

It should be appreciated that, in the embodiments of the present disclosure, the first reference signal may be the same as, or different from, the second reference signal, and a forms of the first reference signal and the second reference signal will not be particularly defined herein.

In a possible embodiment of the present disclosure, in Step 502, the second reference signal may be received in any one of the following modes.

(1) When the uplink IoT of the first network device exhibits the remote interference characteristic, the second reference signal may be received.

When the uplink IoT exhibits the remote interference characteristic, it means that the uplink IoT is greater than the predetermined threshold. Of course, it should be appreciated that, the threshold will not be particularly defined herein.

(2) The second reference signal may be received in accordance with an Operation, Administration and Maintenance (OAM) configuration.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of the ping-pong effect when handling the remote interference.

Figure 6:
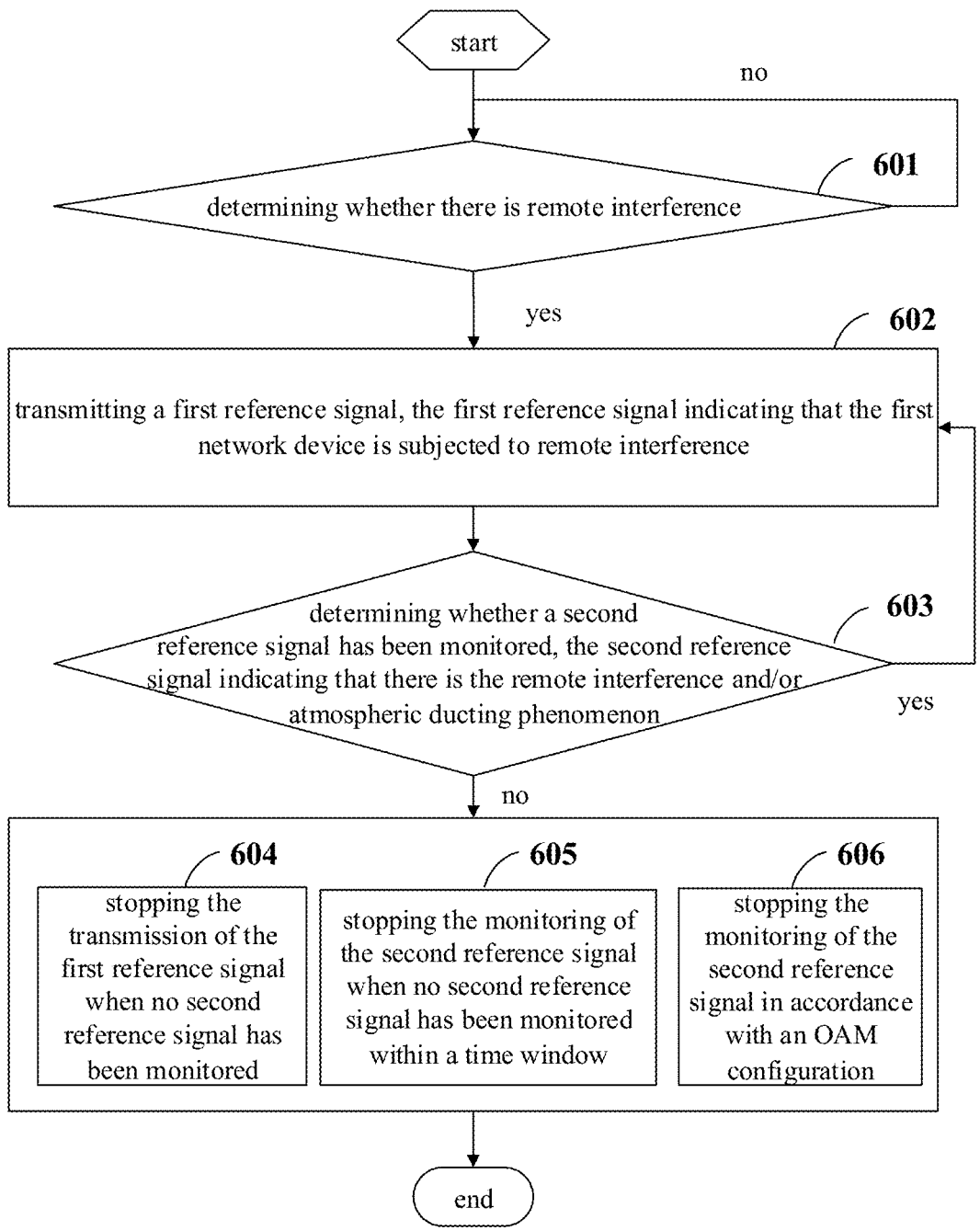
FIG. 6 is another flow chart of the signal transmission method according to one embodiment of the present disclosure.

As shown in FIG. 6, the present disclosure further provides in some embodiments a signal transmission method executed by a first network device which serves as an aggressor site and/or a victim site. The first network device may be a 4G LTE base station, a 5G NR base station, or a network device in another other communication system. The signal transmission method includes the following steps.

Step 601: determining whether there is atmospheric ducting phenomenon, proceeding to Step 602 when there is the atmospheric ducting phenomenon, and performing Step 601 continuously when there is no atmospheric ducting phenomenon.

For example, when an uplink IoT of the first network device exhibits a remote interference characteristic, there is the remote interference may be determined. When the uplink IoT exhibits the remote interference characteristic, it means that the uplink IoT is greater than a predetermined threshold. Of course, it should be appreciated that, the threshold will not be particularly defined herein.

Step 602: transmitting a first reference signal, the first reference signal indicating that the first network device is subjected to the remote interference.

Step 603: receiving a second reference signal, the second reference signal indicating that there is the remote interference and/or atmospheric ducting phenomenon, and proceeding to Step 604, 605 or 606.

Step 604: when no second reference signal has been received, stopping the transmission of the first reference signal.

Step 605: when no second reference signal has been received within a first time window, stopping the receiving of the second reference signal.

The first time window may be, but not limited to, configured by the first network device or an OAM.

Step 606: stopping the receiving of the second reference signal in accordance with an OAM configuration.

It should be appreciated that, when the second reference signal has been received, Step 602 may be performed continuously.

In the embodiments of the present disclosure, in Step 604 and Step 605, when no second reference signal has been received, at least one of the following may be met: a signal intensity of the received second reference signal is smaller than a first threshold, and the quantity of the received second reference signals is smaller than a second threshold.

In the embodiments of the present disclosure, when the second reference signal has been received, at least one of the following may be met: the signal intensity of the received second reference signal is greater than the first threshold, and the quantity of the received second reference signals is greater than the second threshold.

It should be appreciated that, the first threshold and the second threshold may be set according to the practical need, and thus will not be particularly defined herein.

It should be appreciated that, the description about the first reference signal and the second reference signal in FIG. 6 may be the same as that in FIG. 5, and thus will not be particularly defined herein.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

Figure 7:
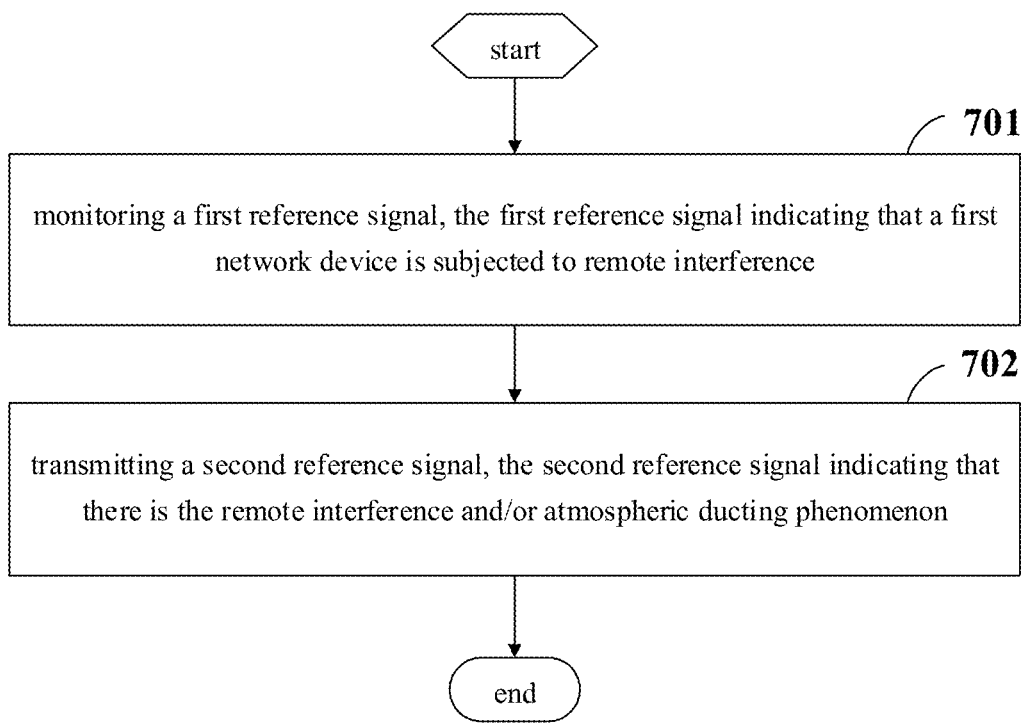
FIG. 7 is yet another flow chart of the signal transmission method according to one embodiment of the present disclosure.

As shown in FIG. 7, the present disclosure further provides in some embodiments a signal transmission method executed by a second network device which serves as an aggressor site and/or a victim site. The second network device may be a 4G LTE base station, a 5G NR base station, or a network device in any other communication system. The signal transmission method includes the following steps.

Step 701: receiving a first reference signal, the first reference signal indicating that a first network device is subjected to remote interference.

The first reference signal may be called as a reference signal of a first type, or an interfered signal. In a possible embodiment of the present disclosure, the first reference signal may be used to trigger another network device to perform an interference backoff operation.

In a possible embodiment of the present disclosure, in Step 701, the first reference signal may be received in any one of the following modes.

(1) When an uplink IoT of the second network device exhibits a remote interference characteristic, the first reference signal may be received.

When the uplink IoT exhibits the remote interference characteristic, it means that the uplink IoT is greater than a predetermined threshold. Of course, it should be appreciated that, the threshold will not be particularly defined herein.

(2) The first reference signal may be received in accordance with an OAM configuration.

Step 702: transmitting a second reference signal, the second reference signal indicating that there is the remote interference and/or atmospheric ducting phenomenon.

The second reference signal may also be called as a reference signal of a second type, or a feedback reference signal. In a possible embodiment of the present disclosure, the second reference signal may be used to determine whether an atmospheric ducting phenomenon has disappeared.

It should be appreciated that, in the embodiments of the present disclosure, the first reference signal may be the same as, or different from, the second reference signal, and a forms of the first reference signal and the second reference signal will not be particularly defined herein.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

Figure 8:
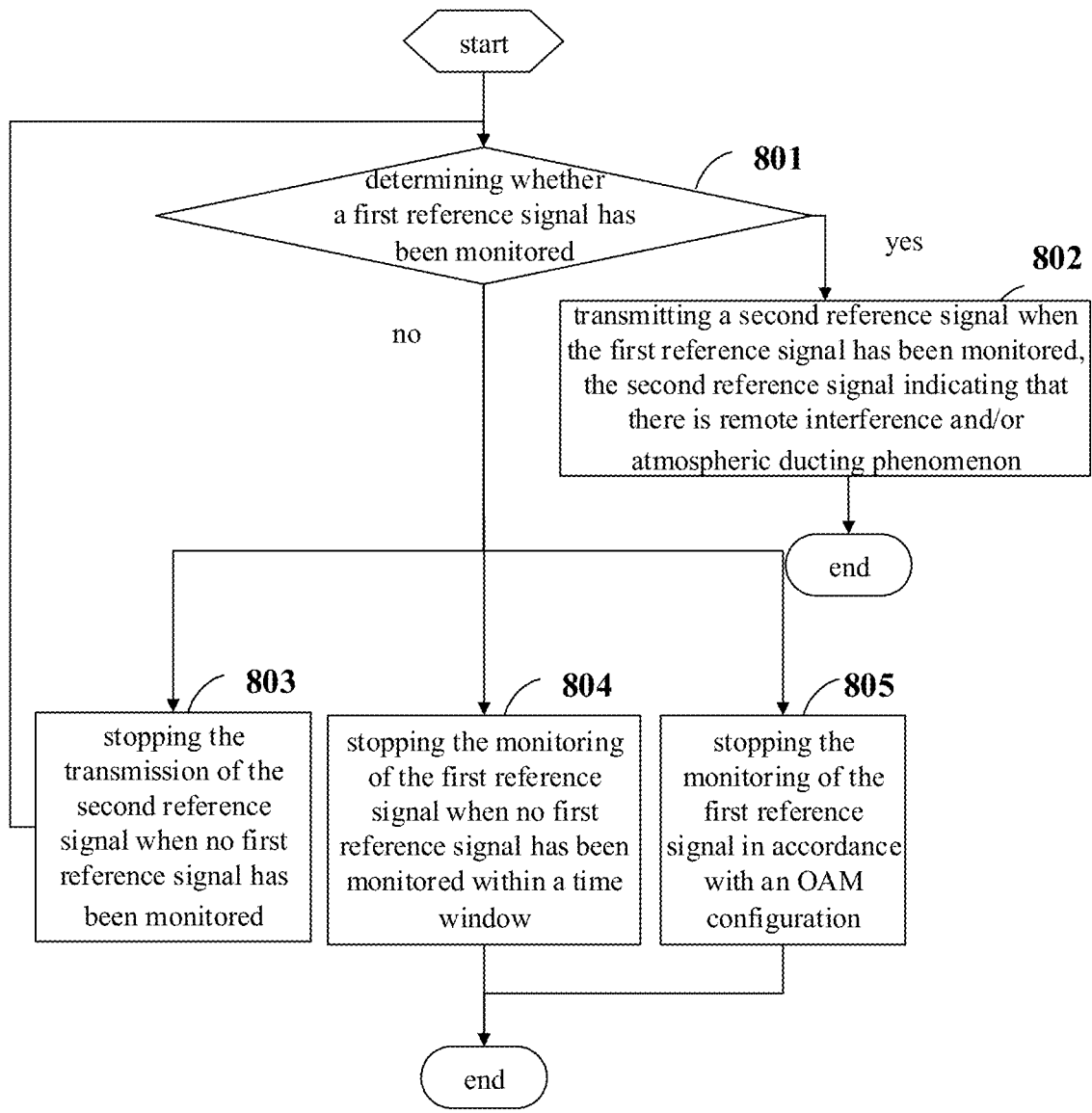
FIG. 8 is still yet another flow chart of the signal transmission method according to one embodiment of the present disclosure.

As shown in FIG. 8, the present disclosure further provides in some embodiments a signal transmission method executed by a second network device which serves as an aggressor site and/or a victim site. The second network device may be a 4G LTE base station, a 5G NR base station, or a network device in any other communication system. The signal transmission method includes the following steps.

Step 801: determining whether a first reference signal has been received, the first reference signal indicating that a first network device is subjected to remote interference; when the first reference signal has been received, proceeding to Step 802, and when no first reference signal has been received, proceeding to Step 803, 804 or 805.

The first reference signal may be called as a reference signal of a first type, or an interfered signal. In a possible embodiment of the present disclosure, the first reference signal may be used to trigger another network device to perform an interference backoff operation.

In a possible embodiment of the present disclosure, in Step 801, the first reference signal may be received in any one of the following modes.

(1) The first reference signal may be received when an uplink IoT of the second network device exhibits a remote interference characteristic.

When the uplink IoT exhibits the remote interference characteristic, it means that the uplink IoT is greater than a predetermined threshold. Of course, it should be appreciated that, the threshold will not be particularly defined herein.

(2) The first reference signal may be received in accordance with an OAM configuration.

Step 802: when the first reference signal has been received, transmitting a second reference signal, the second reference signal indicating that there is the remote interference and/or atmospheric ducting phenomenon.

The second reference signal may also be called as a reference signal of a second type, or a feedback reference signal. In a possible embodiment of the present disclosure, the second reference signal may be used to determine whether an atmospheric ducting phenomenon has disappeared.

It should be appreciated that, in the embodiments of the present disclosure, the first reference signal may be the same as, or different from, the second reference signal, and a forms of the first reference signal and the second reference signal will not be particularly defined herein.

When the first reference signal has been received, remote interference management may be performed. The remote interference management may include remote interference avoidance and/or remote interference cancellation.

Step 803: when no first reference signal has been received, stopping the transmission of the second reference signal, and returning to Step 801.

In the embodiments of the present disclosure, when no first reference signal has been received, remote interference management may be stopped. The remote interference management may include remote interference avoidance and/or remote interference cancellation.

Step 804: when no first reference signal has been received within a second time window, stopping the receiving of the first reference signal.

The second time window may be, but not limited to, configured by the first network device or an OAM.

Step 805: stopping the receiving of the first reference signal in accordance with an OAM configuration.

In the embodiments of the present disclosure, in Steps 803 and 804, when no first reference signal has been received, at least one of the following may be met: a signal intensity of the received first reference signal is smaller than a third threshold, and the quantity of the received first reference signals is smaller than a fourth threshold.

Correspondingly, when the first reference signal has been received, at least one of the following may be met: the signal intensity of the received first reference signal is greater than the third threshold, and the quantity of the received first reference signals is greater than the fourth threshold.

It should be appreciated that, the third threshold and the fourth threshold may be set according to the practical need, and thus will not be particularly defined herein.

It should be appreciated that, the description about the first reference signal and the second reference signal in FIG. 8 may be the same as that in FIG. 7, and thus will not be particularly defined herein.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

Figure 9:
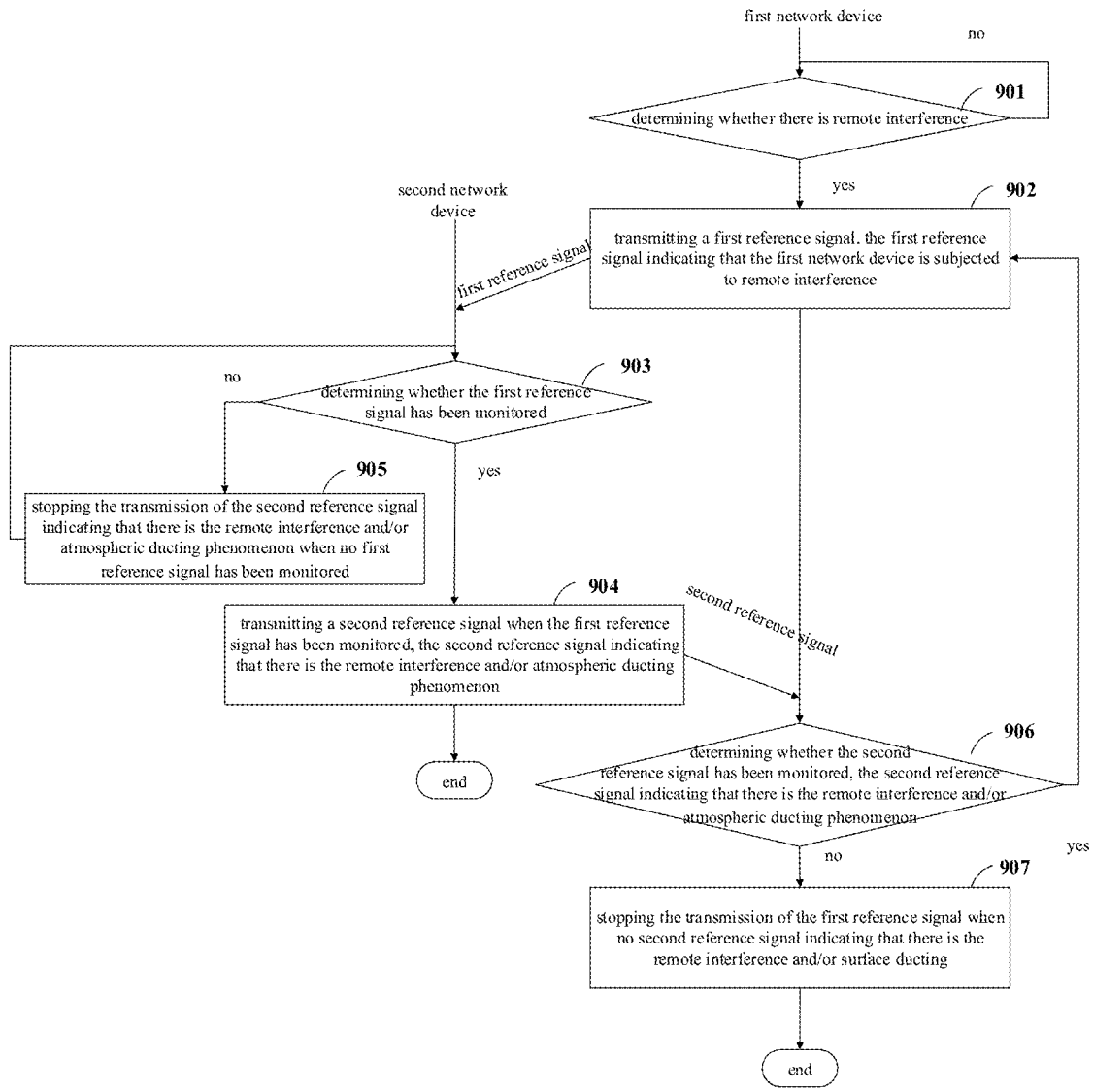
FIG. 9 is a schematic view showing signal transmission according to one embodiment of the present disclosure.

As shown in FIG. 9, the present disclosure further provides in some embodiments a signal transmission method, which includes the following steps.

Step 901: determining, by a first network device, whether there is atmospheric ducting phenomenon, proceeding to Step 902 when there is the atmospheric ducting phenomenon, and performing Step 901 continuously when there is no atmospheric ducting phenomenon.

The first network device may be a victim site.

For example, when an uplink IoT of the first network device exhibits a remote interference characteristic, the first network device may determine that there is the atmospheric ducting phenomenon. When the uplink IoT exhibits the remote interference characteristic, it means that the uplink IoT is greater than a predetermined threshold. Of course, it should be appreciated that, the threshold will not be particularly defined herein.

Step 902: transmitting, by the first network device, a first reference signal, the first reference signal indicating that the first network device is subjected to the remote interference.

In the embodiments of the present disclosure, Step 902 may be the same as the above-mentioned Step 501, and thus will not be particularly defined herein.

Step 903: determining, by a second network device, whether the first reference signal has been received, proceeding to Step 904 when the first reference signal has been received, and proceeding to Step 905 when no first reference signal has been received.

The second network device may be an aggressor site.

Step 904: transmitting, by the second network device, a second reference signal when the first reference signal has been received, the second reference signal indicating that there is the remote interference and/or atmospheric ducting phenomenon.

In the embodiments of the present disclosure, when the first reference signal has been received, at least one of the following may be met: a signal intensity of the received first reference signal is greater than a third threshold, and the quantity of the received first reference signals is greater than a fourth threshold. When the first reference signal has been received, the second network device may perform remote interference management, and the remote interference management may include remote interference avoidance and/or remote interference cancellation.

In the embodiments of the present disclosure, the first reference signal may be the same as, or different from, the second reference signal.

Step 905: stopping, by the second network device, the transmission of the second reference signal when no first reference signal has been received.

In the embodiments of the present disclosure, in Step 905, when no first reference signal has been received, at least one of the following may be met: the signal intensity of the received first reference signal is smaller than the third threshold, and the quantity of the received first reference signals is smaller than the fourth threshold.

Step 906: determining, by the first network device, whether the second reference signal has been received, proceeding to Step 907 when no second reference signal has been received, and returning to Step 902 when the second reference signal has been received.

In the embodiments of the present disclosure, the first reference signal may be the same as, or different from, the second reference signal.

Step 907: stopping, by the first network device, the transmission of the first reference signal when no second reference signal has been received.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

Figure 10:
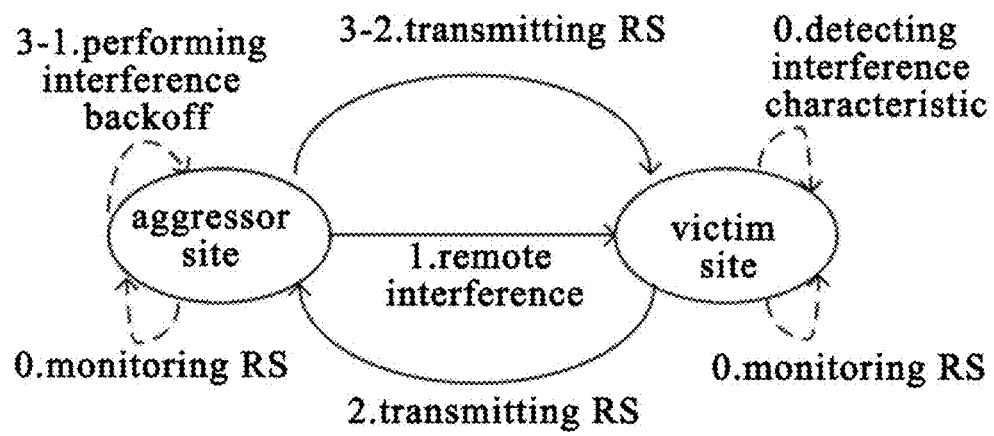
FIG. 10 is a schematic view showing an NR-RIM scheme according to one embodiment of the present disclosure.

FIG. 10 shows a Remote Interference Management (RIM) procedure. A basic procedure may be described as follows.

At a time point T0, all base stations receive a specific reference signal (RS for short), and a potential victim site (e.g., a base station where there is an uplink (UL) service) needs to detect an interference characteristic.

At a time point T1, the atmospheric ducting phenomenon occurs, and the reception of UL data for the victim site is interfered by a downlink (DL) signal from the aggressor site.

At a time point T2, the victim site has detected the remote interference characteristic, and starts to transmit the RS, so as to notify a potential aggressor site to perform a necessary interference backoff operation.

At a time point T3, after the aggressor site has detected the RS, the aggressor site performs the interference backoff operation. When the aggressor site has detected the RS but fails to detect the remote interference characteristic, the aggressor site also needs to transmit the RS.

The interference backoff operation may include at least one of: (1) reducing transmission power of the downlink signal in at least one DL OFDM symbol, (2) increasing a time-domain GP; and (3) prohibiting the transmission of a signal in a specific DL OFDM symbol.

Obviously, after the aggressor site has performed the interference backoff operation, it is able to obviously relieve the interference on the UL data for the remote victim site.

It should be appreciated that, a condition where the base station stops the transmission of the RS may be that any RS fails to be received within a given time period.

After T3, all base stations are capable of receiving the RS from the other base station as long as the atmospheric ducting phenomenon has not disappeared, so the condition for stopping the transmission of the RS may not be triggered. Hence, all the base stations may transmit the RS continuously, so as to maintain the interference backoff operation.

Figure 3:
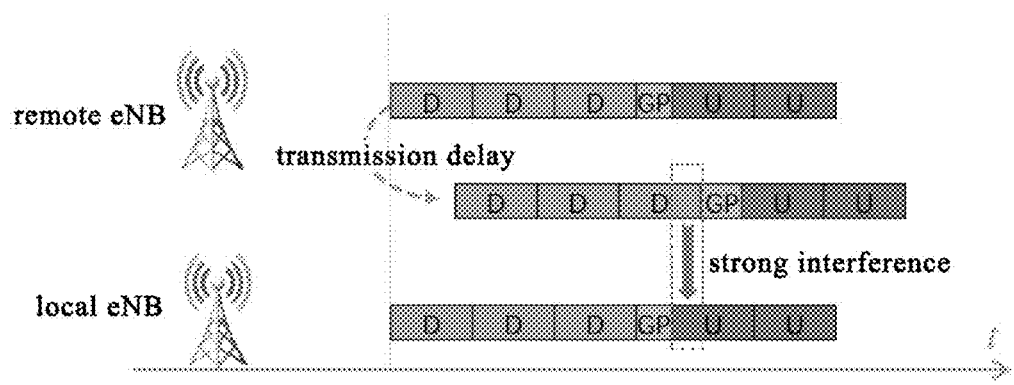
FIG. 3 is a schematic view showing remote interference.

Any base station is incapable of receiving the DL signal (including the RS) from the other base station within a UL signal reception window merely when the atmospheric ducting phenomenon disappears. At this time, the entire RIM procedure in FIG. 3 may be terminated, i.e., (1) an interference backoff procedure may be terminated by the aggressor site, and (2) both the aggressor site and the victim site may stop the transmission of the RS.

Figure 11:
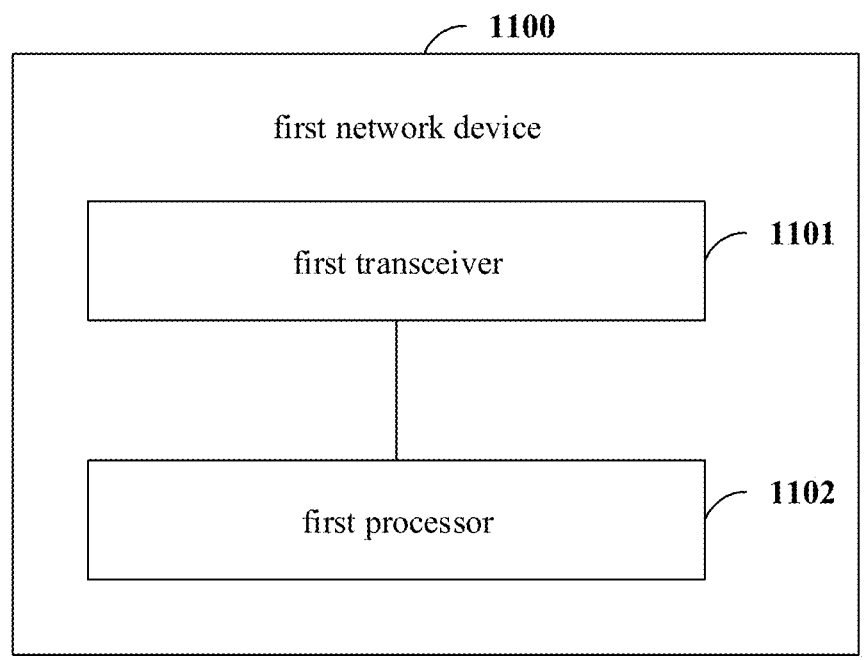
FIG. 11 is a schematic view showing a first network device according to one embodiment of the present disclosure.

In order to prevent the remote interference, the present disclosure further provides in some embodiments a first network device. A principle for the first network device to solve the problem is similar to that for the above-mentioned signal transmission method, so the implementation of the first network device may refer to that of the signal transmission method, and thus will not be particularly defined herein. As shown in FIG. 11, the first network device includes a first transceiver 1101 and a first processor 1102.

The first transceiver 1101 is configured to transmit a first reference signal, and the first reference signal indicates that the first network device is subjected to remote interference. The first transceiver 1101 is further configured to receive a second reference signal, and the second reference signal indicates that there is the remote interference and/or atmospheric ducting phenomenon.

In a possible embodiment of the present disclosure, the first transceiver 1101 is further configured to transmit the first reference signal when there is the atmospheric ducting phenomenon.

In a possible embodiment of the present disclosure, the first transceiver 1101 is further configured to determine that there is the atmospheric ducting phenomenon when an uplink IoT of the first network device exhibits a remote interference characteristic, and transmit the first reference signal.

In a possible embodiment of the present disclosure, the first transceiver 1101 is further configured to stop the transmission of the first reference signal when no second reference signal indicating that there is the remote interference and/or atmospheric ducting phenomenon has not been received.

In a possible embodiment of the present disclosure, the first transceiver 1101 is further configured to receive the second reference signal when the uplink IoT of the first network device exhibits the remote interference characteristic, or receive the second reference signal in accordance with an OAM configuration.

In a possible embodiment of the present disclosure, the first transceiver 1101 is further configured to stop the receiving of the second reference signal when no second reference signal indicating that there is the remote interference and/or atmospheric ducting phenomenon has been received within a first time down, or stop the receiving of the second reference signal in accordance with the OAM configuration.

In a possible embodiment of the present disclosure, the first time window may be configured by the first network device or an OAM.

In the embodiments of the present disclosure, when no second reference signal has been received, at least one of the following may be met: a signal intensity of the received second reference signal is smaller than a first threshold, and the quantity of the received second reference signals is smaller than a second threshold.

In the embodiments of the present disclosure, the first reference signal may be the same as, or different from, the second reference signal.

The first network device in the embodiments of the present disclosure is capable of implementing the steps in the methods as shown in FIGS. 5-6, which will not be particularly defined herein.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

In order to prevent the remote interference, the present disclosure further provides in some embodiments a second network device. A principle for the second network device to solve the problem is similar to that for the above-mentioned signal transmission method, so the implementation of the second network device may refer to that of the signal transmission method, which will not be particularly defined herein.

Figure 12:
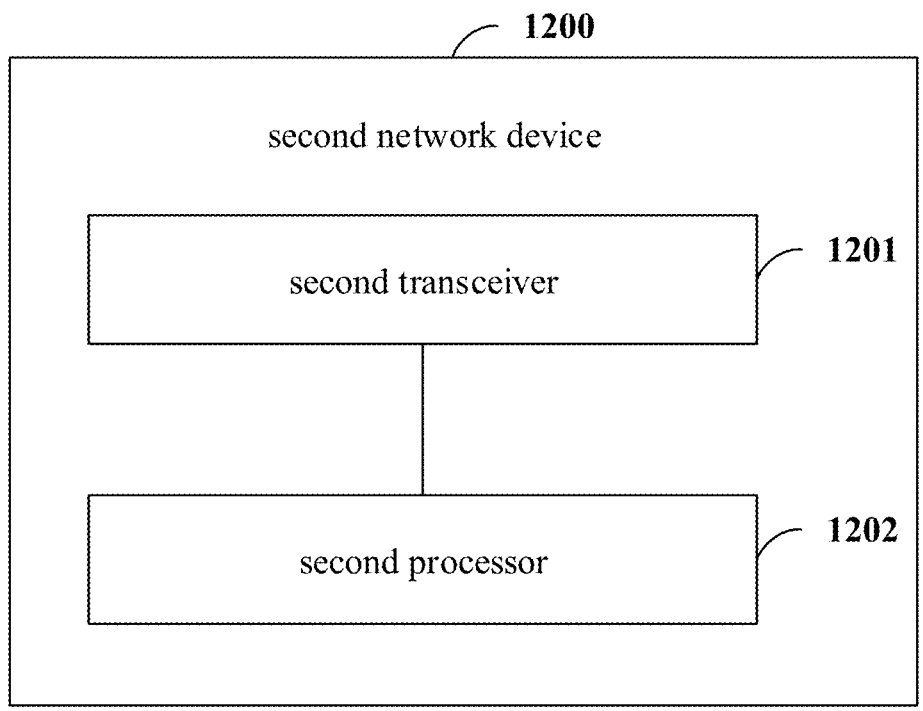
FIG. 12 is a schematic view showing a second network device according to one embodiment of the present disclosure.

As shown in FIG. 12, the second network device includes a second transceiver 1201 and a second processor 1202. The second transceiver 1201 is configured to receive a first reference signal, and the first reference signal indicates that the first network device is subjected to remote interference. The second transceiver 1201 is further configured to transmit a second reference signal, and the second reference signal indicates that there is the remote interference and/or atmospheric ducting phenomenon.

In the embodiments of the present disclosure, the first reference signal may be the same as, or different from, the second reference signal.

In a possible embodiment of the present disclosure, the second transceiver 1201 is further configured to receive the first reference signal when an uplink IoT of the second network device exhibits a remote interference characteristic, or receive the first reference signal in accordance with an OAM configuration.

In a possible embodiment of the present disclosure, the second transceiver 1201 is further configured to perform a remote interference management when the first reference signal has been received, and the remote interference management may include remote interference avoidance and/or remote interference cancellation.

In a possible embodiment of the present disclosure, the second transceiver 1201 is further configured to transmit the second reference signal when the first reference signal has been received.

In a possible embodiment of the present disclosure, the second transceiver 1201 is further configured to stop remote interference management when no first reference signal has been received, and the remote interference management may include remote interference avoidance and/or remote interference cancellation.

In a possible embodiment of the present disclosure, the second transceiver 1201 is further configured to stop the transmission of the second reference signal when no first reference signal has been received.

In a possible embodiment of the present disclosure, the second transceiver 1201 is further configured to stop the receiving of the first reference signal when no first reference signal has been received within a second time window, or stop the receiving of the first reference signal in accordance with an OAM configuration.

In a possible embodiment of the present disclosure, the second time window may be configured by the second network device or an OAM.

The second network device in the embodiments of the present disclosure is capable of implementing the steps of the methods in FIGS. 7-8, which will not be particularly defined herein.

According to the embodiments of the present disclosure, through the second reference signal indicating that there is the remote interference and/or atmospheric ducting phenomenon, it is to accurately determine whether a factor causing the remote interference has disappeared, thereby to effectively prevent the occurrence of a ping-pong effect when handling the remote interference.

In order to prevent the remote interference, the present disclosure further provides in some embodiments a network device. A principle for the network device to solve the problem is similar to that for the above-mentioned signal transmission method, so the implementation of the network device may refer to that of the signal transmission method and thus will not be particularly defined herein.

Figure 13:
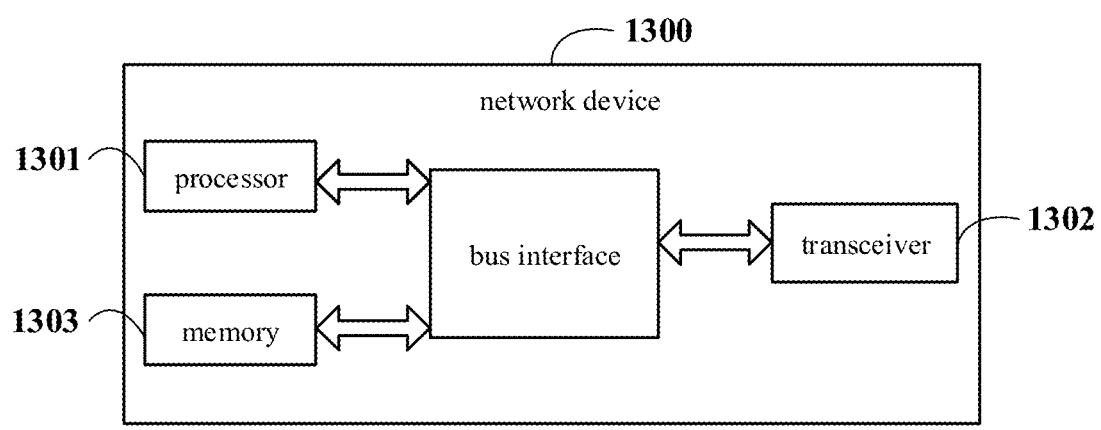
FIG. 13 is a schematic view showing a network device according to one embodiment of the present disclosure.

As shown in FIG. 13, the network device 1300 includes a processor 1301, a transceiver 1302, a memory 1303 and a bus interface.

The processor 1301 may take charge of managing the bus architecture as well as general processings. The memory 1303 may store therein data for the operation of the processor 1301.

In the embodiments of the present disclosure, the network device 1300 may further include a computer program stored in the memory 1303 and executed by the processor 1301. The computer program is executed by the processor 1301 so as to implement the steps of the above-mentioned methods.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit. The bus interface may be provided, and the transceiver 1302 may consist of a plurality of elements, i.e., a transmitter and a receiver for communication with any other devices over a transmission medium.

The steps of the methods or algorithm described in conjunction with the contents mentioned hereinabove may be implemented through hardware, or implemented by a processor executing instructions. The instructions may consist of corresponding modules stored in a Random Access Memory (RAM), a flash memory, a Read Only Memory (ROM), an Electrically Programmable Read Only Memory (EPROM), an Electrically Erasable Programmable Read Only Memory (EEPROM), a register, a hard disk, a mobile hard disk, a read-only optic disk, or any other known storage medium. Illustratively, the storage medium may be coupled to the processor, so that the processor is capable of reading information from the storage medium and writing information into the storage medium. Of course, the storage medium may be a component of the processor. The processor and the storage medium may be located in an Application Specific Integrated Circuit (ASIC). In addition, the ASIC may be located in an interface device of a core network. Of course, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A signal transmission method applied for a first network device, comprising:
   transmitting a first reference signal, the first reference signal indicating that the first network device is subjected to remote interference;
   receiving a second reference signal; and
   determining that the remote interference and/or atmospheric ducting phenomenon exists when the second reference signal is received; and stopping the transmission of the first reference signal when no second reference signal has been received-;
   wherein the method further comprises:

stopping the receiving of the second reference signal when no second reference signals have been detected within a first time window; or stopping the receiving of the second reference signal in accordance with an OAM configuration;

wherein when no second reference signals have been detected, at least one of the following is met: a signal intensity of the received second reference signal is smaller than a first threshold, or the quantity of the received second reference signals is smaller than a second threshold.

2. The signal transmission method according to claim 1, wherein the transmitting the first reference signal comprises transmitting the first reference signal when there is the atmospheric ducting phenomenon.

3. The signal transmission method according to claim 2, wherein the transmitting the first reference signal when there is the atmospheric ducting phenomenon comprises determining that there is the atmospheric ducting phenomenon when an uplink Interference over Thermal (IoT) of the first network device exhibits a remote interference characteristic, and transmitting the first reference signal.

4. The signal transmission method according to claim 1, wherein the receiving the second reference signal comprises: receiving the second reference signal when the uplink IoT of the first network device exhibits the remote interference characteristic; or receiving the second reference signal in accordance with the Operation, Administration and Maintenance (OAM) configuration.

5. The signal transmission method according to claim 1, wherein the first time window is configured by the first network device or the OAM.

6. The signal transmission method according to claim 1, wherein the first reference signal is the same as, or different from, the second reference signal.

7. A signal transmission method applied for a second network device, comprising:
    receiving a first reference signal and determining that a first network device is subjected to remote interference when the first reference signal is received;
    transmitting a second reference signal, the second reference signal indicating that remote interference and/or atmospheric ducting phenomenon exists, and
    stopping the transmission of the second reference signal when no first reference signal has been received;

wherein the method further comprises:
    stopping the receiving of the first reference signal when no first reference signals have been detected within a second time window; or
    stopping the receiving of the first reference signal in accordance with an OAM configuration;
    wherein when no first reference signals have been detected, at least one of the following is met: a signal intensity of the received first reference signal is smaller than a third threshold, or the quantity of the received first reference signals is smaller than a fourth threshold.

8. The signal transmission method according to claim 7, wherein the receiving the first reference signal comprises: receiving the first reference signal when an uplink IoT of the second network device exhibits a remote interference characteristic; or receiving the first reference signal in accordance with the OAM configuration.

9. The signal transmission method according to claim 7, further comprising performing remote interference management when the first reference signal has been received, wherein the remote interference management comprises remote interference avoidance and/or remote interference cancellation.

10. The signal transmission method according to claim 7, further comprising stopping remote interference management when no first reference signals have been received, wherein the remote interference management comprises remote interference avoidance and/or remote interference cancellation.

11. The signal transmission method according to claim 7, wherein the second time window is configured by the second network device or the OAM.

12. A network device, comprising a processor, a memory, and a non-transitory computer program stored in the memory and executed by the processor, wherein the computer program is executed by the processor so as to implement the steps of the signal transmission method according to claim 1.

13. A network device, comprising a processor, a memory, and a non-transitory computer program stored in the memory and executed by the processor, wherein the computer program is executed by the processor so as to implement the steps of the signal transmission method according to claim 7.

* * * * *